Patented Mar. 23, 1954

2,673,151

UNITED STATES PATENT OFFICE 2,673,151

PHOTOSENSITIVE RESIN COMPOSITION

Howard L. Gerhart, Milwaukee, Wis., assignor to Pittsburgh Plate Glass Company, Pittsburgh, Pa., a corporation No Drawing. Application March 13, 1952, Serial No. 276,459

13 Claims. (Cl. 95—7)

The present invention relates to a process of and composition for the formation of designs by the action of light upon mediums having photosensitivity. The invention has particular relation to the formation of designs in or upon resinous bodies such as are obtained by conjointly polymerizing a polyester of an olefinically unsaturated dicarboxylic acid and a dihydroxy alcohol and a polymerizable olefinic monomer designed to provide a cross-linking effect between polyester molecules.

One object of the invention is to provide a process of and composition for photographically printing designs by use of which the designs can be formed directly in or upon a resinous material during the process of polymerizing the components of the resin.

A second object of the invention is to provide a method of and composition for photographically printing upon resinous materials in which the use of separate surface films embodying photosensitive components is avoided.

A third object of the invention is to provide a process of and composition for photographically printing designs in which the designs are formed directly in a hard, abrasion resistant, moisture resistant and distortion resistant material.

A fourth object is to obviate the use of developing and fixing agents in photographically printing upon a resin.

A fifth object of the invention is to provide a process whereby designs can be outlined photographically upon a resin sheet in the formation of templates such as are employed in laying out the sheathings of airplanes or the like.

These and other objects of the invention will be apparent from consideration of the following specification and the appended claims.

A conventional method of photographically reproducing designs and characters comprises exposing sheets of a plastic or paper having coatings of a water soluble material such as gelatin containing a photosensitive silver halide. When such sheets are exposed to light, the intensity of which varies in accordance with the image to be produced, and are then treated with solutions of developing and fixing agents, the designs are reproduced with a high degree of accuracy. Such process is objectionable in several respects. (A) It is inconvenient requiring repeated washings of the exposed sheets with various solutions. It also requires drying of the sheets. (B) The sheets are easily torn or scratched, are not resistant to moisture and may easily be stretched out of shape so that reproductions are not suitable for use where a high degree of accuracy is desirable, e. g. where the sheets are to be used as templates for outlining parts of airplane sheathings.

It has heretofore been recognized that certain polyesters of unsaturated dicarboxylic acids and dihydroxy alcohols could be copolymerized with an olefinic monomer designed to cross-link the polyester molecules in such manner as to provide hard abrasion resistant, moisture resistant bodies highly useful for many purposes. Some resins of this type are disclosed in Industrial and Engineering Chemistry, vol. 31, No. 12, page 1512 or vol. 32, No. 1, page 64.

It has now been discovered that the foregoing copolymerizable mixtures of (A) polyesters of alpha-beta ethylenic, alpha-beta dicarboxylic acids and (B) ethylenically unsaturated compounds copolymerizable therewith, can, by addition of certain sulfur compounds be readily sensitized to the action of light, in such manner as to permit the use of the materials for photographic reproduction. In such reproduction an appropriate body of the liquid, copolymerizable mixture containing the sulfur-containing sensitizing agent and usually containing catalyst of copolymerization such as a peroxide, is exposed by contact or by projection to the desired image. Preferably exposure is prolonged under the action of the light at least until partial polymerization, e. g. a gel stage is reached. If desired, the light may then be removed and the final cure may be effected by heating the mixture until final cure is attained.

It is a property of the copolymerizable mixtures which are sensitized and treated in accordance with the provisions of this invention, that the images are produced usually in low relief upon the body of resin. There are no separate layers or media. The resin assumes a hardened, thermoset state in which it is highly durable and insoluble and thus imparts great permanence to the reproduction.

It is a characteristic of the process that conventional developing and fixing techniques are not required. Exposure and cure of the resin is sufficient to form the desired image. Curing of the exposed material follows conventional techniques.

A wide variety of organic sulfur-containing compounds are contemplated as sensitizing agents in the copolymerizable mixtures. Naturally, it is desirable that they have a reasonable degree of solubility in or compatibility with, the mixtures. Examples of such sulfur-containing compounds include:

The dithiocarbamates
The thiuram compounds
The thiazoles or their derivatives, the thiazyl compounds
The trithiocarbonates
Xanthogenate compounds Many of these compounds include the sulfhydryl (—SH group).

Most of these compounds include two sulfur groups directly joined to a carbon atom. The dithio carbamate, the thiurams and the xanthogenates include the

group.

Appropriate examples of dithio carbamates include:

Piperidene pentamethylene dithiocarbamate
Dimethyl dithiocarbamate
Diethyl dithiocarbamate
Dibenzyl dithiocarbamate
Dibutyl dithiocarbamate Zinc salts of the foregoing compounds are also included. Thiuram compounds that may be used as sensitizers include the mono, di and tetra sulfides of tetra methyl, tetra ethyl or tetra butyl derivatives of the thiuram group:

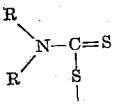

Such compounds include tetramethyl thiuram monosulfide, tetramethyl thiuram disulfide, and tetramethyl thiuram tetrasulfide, dipentamethylene thiuram disulfide and others.

The thiazoles and thiazyl compounds include:

2 mercaptothiazole
2 mercaptobenzothiazole
N cyclohexyl 2 benzothiazole sulfenamide
2 benzothiazyl monosulfide
Zinc salts of 2 mercaptobenzothiazol The trithio carbonates are represented by methyl and dimethyl trithiocarbonates and zinc salts and disulfides thereof.

Xanthogenates are represented by:

Zinc butyl xanthate and dibutyl xanthogendisulfide

Most, if not all, of the foregoing compounds are organic sulfur compounds containing one or more sulfur atoms in the form of sulfide or sulphydryl groups. They also include hydrocarbon groupings. Many of these compounds are typical organic rubber vulcanization accelerators.

Polyesters which may be admixed with olefinic monomers to provide copolymerizable mixtures include the long chain esters of dihydroxy alcohols and such unsaturated dicarboxylic acids as maleic acid or fumaric acid, cis-endomethylene-delta-4-tetrahydrophthalic acid or other dicarboxylic acids containing active olefinic groups and a pair of carboxyls (or anhydride groups) in alpha-beta position with respect to each other. Most of these polyesters include a plurality of groups represented by the basic structure; —C=C—C=O involving a carbon-oxygen conjugation. A part of the unsaturated dicarboxylic acid may be replaced by molecularly equivalent amounts of a saturated dicarboxylic acid such as phthalic acid, succinic acid, adipic acid or the like. The ratio of the saturated acid may be molecularly equal to or even five or sixfold of the unsaturated acid.

The glycols contemplated as suitable for the preparation of the polyesters of these acids comprise diethylene glycol, propylene glycol, dipropylene glycol, triethylene glycol, tetraethylene glycol, or other open chain dihydric alcohols. In order to esterify the mixture, it may be heated under reflux of xylene or other medium for 4 to 20 hours or thereabout.

The olefinic monomers employed as components of the resin bodies are designed to provide a cross linking or netting effect between the unsaturated groups in the polyester chains. The monomers which may be so employed comprise styrene, vinyl toluene, methyl acrylate, methyl methacrylate, allyl acrylate, diallyl phthalate, diallyl sebacate, diallyl succinate, vinyl chloride, or the like. These compounds are usually liquids, soluble in the polyester component of the resin, copolymerizable with the polyester and are represented by the general formula:

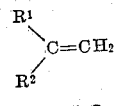

where $R^1$ is hydrogen or a negative group such as phenyl, benzyl,

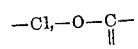

or the like. $R^2$ may be from the same class. At least one of the groups $R^1$ and $R^2$ is negative with respect to the terminal $>C=CH_2$ group.

In order to form a copolymerizable composition suitable for photosensitization, the polyesters and the monomer will comprise from 15 to 50%. The polyester will usually comprise 50 to 85% of the polyester-monomer mixture. Molar ratios of the unsaturated acid in the polyester usually are satisfactory. Catalysts of polymerization such as tertiary butyl hydroperoxide, acetyl peroxide, benzoyl peroxide, lauroyl peroxide or other catalysts of addendum reaction, notably of the peroxide type, are incorporated with the copolymerization mixtures. The amount of catalyst of course is variable, dependent upon the speed of the reaction desired in the polymerizable mixture and other factors. Usually, amounts within a ratio of 1/10 of 1% up to 5% based upon the polymerizable mixture may be employed. A ratio of .5% of the catalyst constitutes a good average.

Of the various appropriate sulfur containing photosensitive agents which may be incorporated in the compositions, the following are deemed to be quite important.

N-cyclohexyl-2-benzothiazole sulfenamide
Tetramethyl thiuram monosulfide
Tetramethyl thiuram disulfide
Tetramethyl thiuram tetrasulfide
Dipentamethylene thiuram disulfide
Mercaptobenzo-thiazole
Piperidine pentamethylene dithiocarbamate These are all vulcanization accelerators in rubber and are typical of that class.

These sensitizing agents may be employed in relatively wide variations of proportions, for example, .1 to 5%. Usually amounts above about .5% are not necessary though they may be employed if so desired.

If the photosensitive resin compositions are to be maintained in storage for substantial periods of time before they are subjected to polymerization, it may be desirable to include an inhibitor such as trimethyl amine hydrochloride, tertiary butyl catechol, hydroquinone or the like. These may be added to the polyester while it is warm, e. g. at about 100° C. These usually are employed in small amounts, e. g. about 0.05 to 1.0% by weight based upon the polyester mixture. Needless to say, if the composition is to be stored, it is preferable to incorporate the catalyst of polymerization just before the final curing operation or at least within a relatively short time before such curing operation.

When it is desired to form plates or other bodies of the compositions embodying a design applied photographically, the polymerizable composition may be enclosed in a suitable transparent mold, for example between spaced plates of glass. The designs may be applied directly to the surface of the mold by any convenient method, e. g. by means of light opaque or light resistant materials such as crayons, waxes, paints or the like, marked upon the mold surfaces. Stencils and transparent negatives carrying designs cut in or printed upon a more or less opaque material or applied in any other convenient way may also be juxtaposed to the surface of the mold. In order to form the design upon the material to be molded, light is permitted to shine through the design and into the contents of the mold. The operation is much the same as that involved in conventional photoprinting in this respect. The time of irradiation is susceptible of variation dependent upon the intensity desired in the design and the intensity of the light employed in the printing operation. Usually 5 to 60 minutes is sufficient. After the resin has gelled at a temperature of approximately 70 to 100° F. the resin may be finally hardened by an appropriate baking operation at a temperature of, for example, 200 to 300° F. for a period of about 30 minutes more or less dependent upon the temperature and the hardness desired in the finished product. A good temperature for baking is approximately 250° F. for a period of 30 minutes.

The design may appear as a haze in the plastic. In other instances, the design may be substantially depressed or elevated above the general surface of the resinous body, in low relief.

An explanation of the formation of the design in relief is that certain portions of the solution, under the influence of the light pattern, set more rapidly than other portions. The portions first to set, shrink and then draw fluid from the more liquid portions in order to maintain a surface level. When the portions curing first have set so hard that they no longer are capable of flow under the conditions of operation, the more liquid portions continue to cure, and in so doing, they shrink, but since there is no liquid or flowable material contiguous thereto, shrinking is not compensated, and produces depressions in the surface. The designs are thus produced by mechanical effects which are in turn controlled by chemical effects.

Apparently the photosensitizing effects of organic sulfur compounds containing divalent sulfur in the curing of copolymerizable mixtures of alpha-beta ethylenic, alpha-beta dicarboxylic acids has never been previously observed and is an important feature of this invention. However, it will be apparent that the polymerization of the mixture is not necessarily limited to the use of such compounds. The invention also includes the control of the cure during the exposure stage through the use of other agents that control the rate of polymerization and at the same time are activated or deactivated by light. Such other sensitizing agents include benzophenone and benzanthrone which may be substituted for the sulfur compounds. Indeed, the cure of the copolymerizable mixtures of polyesters and the ethylenic compounds or monomers is substantially speeded up by strong illumination even in the absence of photosensitive catalysts. The reaction is relatively slow and probably of limited commercial value, but it is within the scope of this invention to form images photographically in uncatalyzed copolymerizable mixtures of (A) polyesters of alpha-beta ethylenic, alpha-beta dicarboxylic acids and dihydroxy alcohols and (B) compounds containing the group $>C=CH_2$, by exposing a fluid mixture to light in desired pattern for a sufficient period of time. Developing and fixing operations are not required in the treatment of the images. However, it will be apparent that if so desired, the exposed bodies before final development, contain soft, more or less fluid portions that lend themselves to preferential absorption of dyes, washing with solvents, and other operations designed to increase or vary contrast in the images.

It is to be emphasized that the application of the invention is not limited to forming designs in polymerizable mixtures in molds or cells such as are obtained by appropriately spacing glass plates. It is also contemplated to form the designs by spreading the polymerizable mixtures such as a mixture of styrene and a polyester of propylene glycol and maleic anhydride or fumaric acid upon a surface such as a surface of metal or a glass plate and then to print the design thereupon photographically by such methods as exposure to light passing through a suitable film or plate in a photographic enlarger.

The resinous bodies may be incorporated with fillers such as glass fibers or the like designed to give a reenforcing effect.

The invention is applicable to the formation of printing plates or to the preparation of photo templates, decorative pieces, ornamental plaques, plates, etc.

The following examples specifically illustrate the application of the principles of the invention:

*Example I*

As an example of the operation of the invention, a resin monomer was prepared as follows: A polymerizable mixture of 30 grams of styrene and 70 grams of the propylene polyester of maleic acid was prepared. To this was added 0.5 gram of tetramethyl thiuram tetrasulfide as the photosensitizing agent, and 0.5 gram tertiary butyl hydroperoxide as the catalyst. This mixture was poured into a cell formed by clamping together two sheets of glass which were separated by means of a thin strip of rubber gasket placed around the perimeter. On the outside face of one plate a design was drawn with a wax pencil. The cell was placed in such position that a strong light would fall on the design. Sunlight or the light from carbon arc is adequate. The resin monomer gelled after 5 to 60 minutes exposure to the light at 70 or 100° F. After the resin was thoroughly gelled, the cell was placed in an oven at 250° F. for 30 minutes, in which time the resin had cured to a hard plastic.

The design which was drawn upon the glass plate was fully transferred to the plastic plate.

Example II

A square bottle was filled with a resin monomer made by mixing 50 grams of styrene with 50 grams of diethylene polyester of fumaric acid. A half gram of tertiary butyl hydroperoxide catalyst and a half gram of mercaptobenzothiazole were added. The latter is a photosensitizing agent. Designs were drawn upon one or more sides of the bottle. After exposing the bottle to a strong light for 30 minutes in sunlight at 115° F., followed by a curing treatment at 250° F. for 45 minutes, the design was formed in the plastic. The glass was broken and the design was readily seen.

Example III

A mixture of 50 grams ethylene polyester of endomethylene tetrahydrophthalic acid, 30 grams styrene, 20 grams maleic anhydride, 0.5 gram benzoyl peroxide as a catalyst and 0.5 gram of tetramethyl thiuram monosulfide as a photosensitizing agent was prepared. The above mixture was placed in a glass cell as in Example I. A photographic negative was placed on the outside face of one plate of glass. The light from a carbon arc was focused upon the negative for 30 minutes at room temperature. After curing for one hour at 200° F., the image of the negative was transferred into the plastic plate.

Reproductions which are full scale or enlargements or reductions of the original can be formed in resins produced by the processes shown in Examples I, II or III by projection of an image upon the cell by means of a suitable lens system.

Example IV

With a view of forming images photographically without catalysts, one should eliminate the tetramethyl thiuram tetrasulfide acid, if desired, the tertiary butyl hydroperoxide in Example I and proceed as in the latter example irradiation being continued with artificial light or sunlight until gellation has been attained. Subsequently, the gell is hardened by baking. This procedure is necessarily slow and considerable time must be allowed.

Example V

Substitute benzanthrone for tetramethyl thiuram tetrasulfide in Example I and proceed as in the latter example.

Example VI

Substitute benzophenone for tetramethyl thiuram tetrasulfide in Example I and proceed as in the latter example.

In the examples, the polyesters may be in part replaced by the anhydride of maleic acid. The substitution may be within a range of about 5 to 50% of the polyester.

The end carboxyls of the polyesters may be, in part at least, neutralized by a monohydric alcohol such as ethyl alcohol, carbitol, 2-ethyl hexanol.

The formation of the images by photographic exposure of the liquid monomer in molds or upon supporting backings has been described. However, exposure of the partially polymerized material as a gell is also contemplated. For example, a catalyst of gellation may be added to the unpolymerized mixtures disclosed in Examples I, II, or III. After gellation has progressed sufficiently far to provide a self supporting sheet or other body, the desired image may be imposed by photographic exposure of the sheet. The latter may then be cured as described to hard resinous state.

Appropriate catalysts of gellations are ethylene diamine, aniline, cyclohexyl amine or other primary, secondary or tertiary amine. These may be added in amounts of 1 or 2 per cent and will effect gellation, usually within a period of five or six hours even at room temperature. The gells easily cure when they are exposed to light and are then baked.

By the foregoing procedures it is possible to form in plastic reproductions of etchings, drawings, templates, etc. which are hard, resistant to stretching, insoluble and highly resistant to the effects of moisture. They constitute an ideal medium for the manufacture and reproduction of templates employed in laying out and cutting various articles such as sheets of metal used as sheathing in airplanes. Their value is enhanced for this purpose by the fact that the plastic sheets after they are formed, require no developing, fixing or washing operations.

The forms of the invention herein described are by way of illustration. Numerous modifications may be made therein without departure from the spirit of the invention or the scope of the following claims.

This application is a continuation-in-part of application Serial No. 697,907, filed September 19, 1946, now abandoned.

I claim:

1. As a new composition of matter a copolymerizable mixture comprising as one component a polyester of a dihydric alcohol and an alpha-beta ethylenically unsaturated, alpha-beta dicarboxylic acid and as a second component a polymerizable olefinic monomer adapted to cross-link the polyester molecules, the mixture of the two components further containing .1 to 5% of a thiuram sulfide which is a rubber vulcanization accelerator.

2. As a new composition of matter, a copolymerizable mixture comprising as one component a polyester of a dihydric alcohol and an alpha-beta ethylenically unsaturated, alpha-beta dicarboxylic acid and as a second component, a polymerizable olefinic monomer adapted to cross-link the polyester molecules, the mixture of the two components further containing .1 to 5% of a tetramethyl thiuram sulfide.

3. As a new composition of matter, a copolymerizable mixture comprising as one component a polyester of a dihydric alcohol and an alpha-beta ethylenically unsaturated, alpha-beta dicarboxylic acid, and as a second component a polymerizable olefinic monomer adapted to cross-link the polyester molecules, the mixture of the two components further containing .1 to 5% of a tetramethyl thiuram sulfide containing 1 to 4 sulfur atoms in the sulfide linkage.

4. As a new composition of matter, a copolymerizable mixture comprising as one component, a polyester of a dihydric alcohol and an alpha-beta ethylenically unsaturated, alpha-beta dicarboxylic acid and as a second component a polymerizable olefinic monomer adapted to cross-link the polyester molecules, the mixture of the two components further containing .1 to 5% of a compound of the class consisting of:

N-cyclohexyl-2-benzothiazole sulfenamide
Tetramethyl thiuram monosulfide
Tetramethyl thiuram disulfide
Tetramethyl thiuram tetrasulfide
Dipentamethylene thiuram disulfide
Mercaptobenzo-thiazole
Piperidine pentamethylene dithiocarbamate.

5. In a process of forming resinous bodies bearing an image of predetermined outline, the steps which comprise exposing a copolymerizable mixture of (A) a polyester of a dihydroxy alcohol and an ethylenically unsaturated, alpha-beta dicarboxylic acid, (B) a polymerizable ethylenically unsaturated compound and (C) a photosensitizing agent which is a sulfur-containing organic, rubber vulcanization accelerator, to a light pattern in which there is a differential of light intensity between selected areas, to effect at least a partial cure of the copolymerizable mixture while it is being exposed and heating the mixture to cure it to hard resinous state.

6. In a process of forming a resinous plastic body having an image of predetermined outline formed therein, the steps which comprise exposing a copolymerizable mixture of (A) a polyester of a dihydroxy alcohol and an ethylenically unsaturated alpha-beta dicarboxylic acid, (B) a polymerizable ethylenically unsaturated compound, (C) a peroxide catalyst of copolymerization for the polyester and said compound and (D) a photosensitizing agent comprising a sulfur-containing, organic, rubber vulcanization accelerator to a light pattern in which there is a differential of light intensity between selected areas to effect at least partial cure of the copolymerizable mixture while it is being so exposed and subsequently heating the mixture at a temperature of about 200–300° F. in order to cure it to hard resinous state.

7. In a process of forming a resinous plastic body having an image formed therein, the steps which comprise exposing to a light pattern in which there is a differential of intensity between selected areas, a copolymerizable mixture of (A) a polyester of an ethylenically unsaturated alpha-beta dicarboxylic acid and an open chain dihydric alcohol, (B) a polymerizable ethylenically unsaturated compound, (C) an organic, sulfur-containing rubber vulcanization accelerator and (D) a peroxide type catalyst of polymerization, until the mixture has partially polymerized and heating the partially polymerized mixture to cure it to resinous state.

8. A process as defined in claim 7 in which the polyester is of maleic anhydride and propylene glycol.

9. In a process of forming a resinous body having an image of predetermined outline formed therein, the steps which comprise exposing to a light pattern in which there is a differential of light intensity between selected areas, a copolymerizable mixture of (A) a polyester of endomethylene delta 4 tetrahydrophthalic acid and an open chain dihydric alcohol and (B) a polymerizable ethylenically unsaturated compound and (C) a small amount of an organic sulfur-containing rubber vulcanization accelerator until the mixture has partially polymerized, then heating the partially polymerized mixture to effect hardening thereof.

10. As a new composition of matter, a copolymerizable mixture of (A) a polyester of an ethylenically unsaturated, alpha-beta dicarboxylic acid and a dihydric alcohol, (B) a polymerizable ethylenically unsaturated compound and (C) an effective amount of a photosensitizing agent which is an organic, sulfur-containing, rubber vulcanization accelerator in effective amount.

11. A composition as defined in claim 10 in which the mixture further contains .1 to 5% of a peroxide which is a catalyst of copolymerization of the mixture.

12. As a new composition of matter, a copolymerizable mixture of (A) a polyester of an ethylenically unsaturated alpha-beta dicarboxylic acid and a dihydric alcohol, (B) a polymerizable ethylenically unsaturated compound and (C) a photosensitizing agent which is an organic sulfur-containing rubber vulcanization accelerator, in the amount of .1 to 5%.

13. A composition as defined in claim 12 in which the unsaturated dicarboxylic acid is maleic acid.

HOWARD L. GERHART.

References Cited in the file of this patent

UNITED STATES PATENTS

| Number | Name | Date |
| --- | --- | --- |
| 1,587,272 | Beebe | June 1, 1926 |
| 1,587,274 | Beebe | June 1, 1926 |
| 2,099,297 | Clement | Nov. 16, 1937 |
| 2,195,362 | Ellis | Mar. 26, 1940 |
| 2,305,224 | Patterson | Dec. 15, 1942 |